Sept. 6, 1927. 1,641,195
E. ROUČKA
MEASURING SYSTEM
Filed July 17, 1922
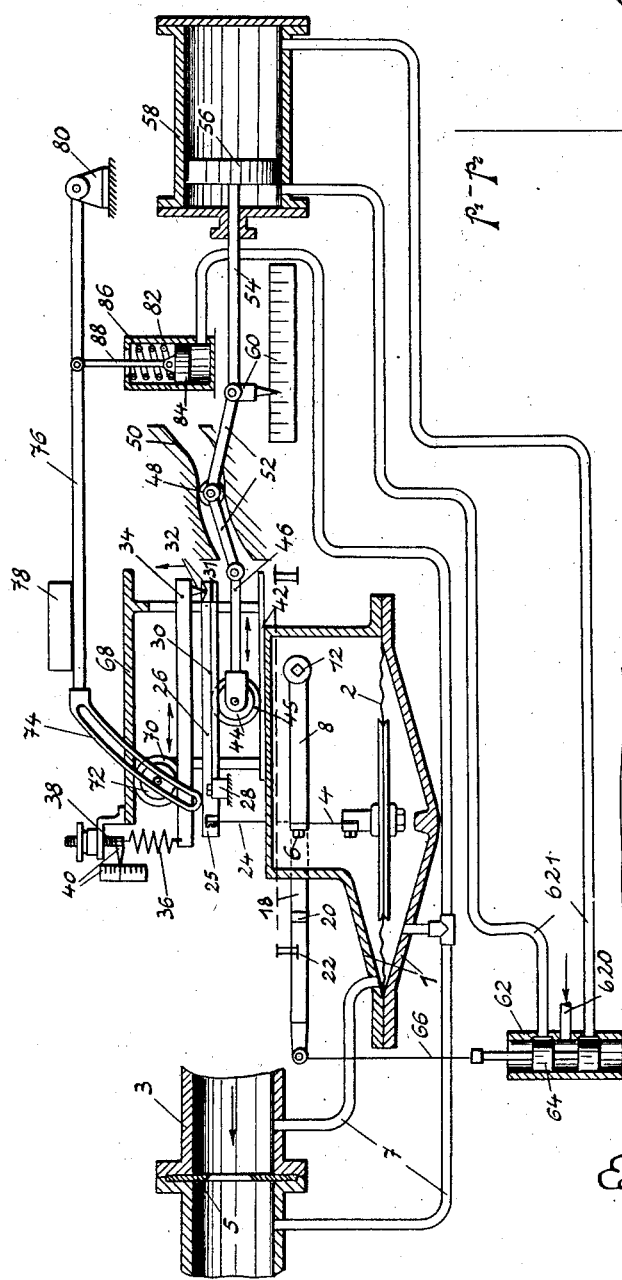
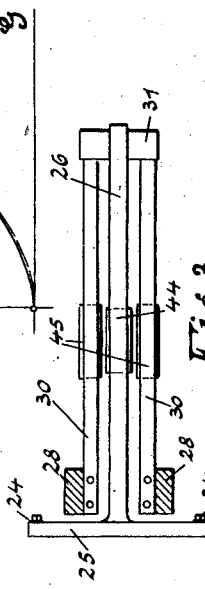
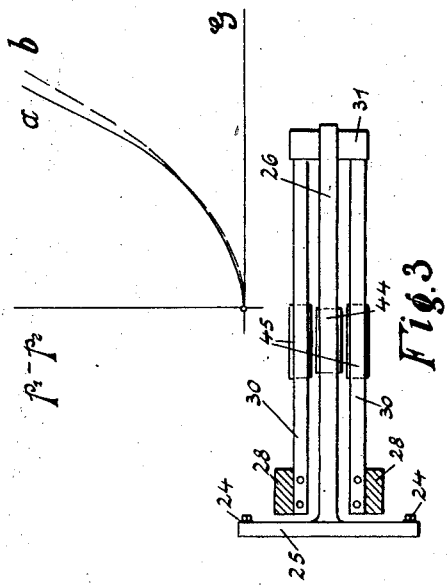
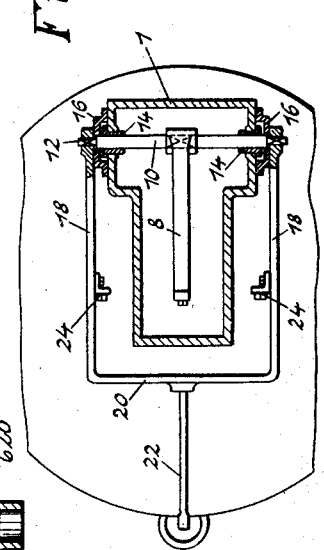
INVENTOR:
Eerich Roučka,
BY
Everett + Rook,
ATTORNEYS.

Patented Sept. 6, 1927.

1,641,195

UNITED STATES PATENT OFFICE.

ERICH ROUČKA, OF BLANSKO, CZECHOSLOVAKIA.

MEASURING SYSTEM.

Application filed July 17, 1922, Serial No. 575,751, and in Czechoslovakia September 1, 1921.

This invention relates in general to a system similar to that disclosed in my copending applications Serial Nos. 575,753 and 575,755, both filed July 17, 1922 for measuring a physical or chemical quantity, quality, or value, for instance flow of fluid, composition of fluids, fluid pressure, temperature, electrical quantities, etc., by means of auxiliary mechanical energy. More particularly the invention relates to a system for varying the leverage of a system of levers in accordance with a variable value by means of auxiliary energy, the leverage serving to control a measuring device for measuring the said value.

The invention consists in the provision of a system of the character described comprising means whereby the value to be measured cooperates with or is compensated or balanced by a second force produced or varied through a system of levers by other auxiliary energy controlled by cooperation of the value and said second force, which auxiliary energy varies the leverage of said system of levers to maintain balance in the system and measure said value.

Further objects of the invention are to provide in such a system means whereby the movement or change of the leverage is approximately in quadratic relation to the force produced by the value being measured; to provide means whereby the leverage can be changed or varied without displacing the point of application of the force of the value and the second force cooperating therewith to the lever system; to provide means interposed between the source of said auxiliary energy and said lever system for producing a special and definite relation between the leverage and said value; to provide in such a system a fluid actuated motor for varying the leverage to maintain balance in the system; and to obtain other results and advantages as may be brought out by the following description.

Referring to the accompanying drawings, in which like numerals of reference indicate the same parts throughout the several views:

Figure 1 is a diagrammatic illustration of a system embodying my invention;

Figure 2 is a horizontal sectional view taken on the line II—II of Fig. 1;

Figure 3 is a plan view of a portion of the lever system shown in Fig. 1, and

Figure 4 is a diagram or chart illustrating the functions of the lever system.

In the present instance the value to be measured is in the form of a fluid flowing through a conduit 3 having a flow resistance device 5 therein. Pipes 7 are connected to the conduit 3 at opposite sides of the flow resistance device 5 and to a diaphragm chamber 1 at opposite sides of a diaphragm 2, so that the diaphragm is actuated by or sensitive to differences in pressure in the conduit 3 at opposite sides of the flow resistance device 5. The diaphragm 2 is connected by a flexible or resilient member 4 by any suitable means such as the fastening member 6 to one end of a lever 8, the other end of which is mounted on a shaft 10 journaled in the diaphragm chamber 1. The shaft 10 projects outwardly from the diaphragm chamber through packing bushings 14 and boxes 16, the ends of said shaft being provided with polygonal portions 12 to which are connected the arms 18 of a U-shaped lever 20.

The force of the value being measured acting upon the diaphragm 2 is balanced by the force of a spring 36 which is varied through a system of levers by means of auxiliary energy controlled by means responsive to departures from balance of said two forces actuated by cooperation of the value being measured acting on the diaphragm 2, and the said spring 36. In the present instance the auxiliary energy is a fluid under pressure which operates a fluid motor comprising a cylinder 58 and a piston 56, which motor is controlled by a governor valve comprising a cylinder 62 and valve piston 64. The piston 64 is connected by a member 66 to an extension arm 22 of the lever 20. With this construction, upon departures from balance in the system, such as variations in the pressure of the fluid flowing through the conduit 3, the diaphragm 2 actuates the levers 8 and 20 which in turn move the valve piston 64 in one direction or the other. Fluid is then admitted by said valve from a supply pipe 620 to one side of the piston 56 of the fluid motor and from the other side thereof through pipes 621, whereby said piston 56 is moved in one direction. Obviously the lever 20 is responsive to departures from balance of said sensitive means 1, 2 and the means for applying the force of spring 36 to the lever system; and the governor 62, 64 is operatively connected to said lever 20 and actuated thereby.

One end of the spring 36 is connected to an adjusting screw 38 mounted in a fixed support 68, and the opposite end of said spring is connected to one end of a lever 34, the fulcrum of which comprises the rollers 70 and 72, the first-mentioned of which engages the fixed support 68 and the second-mentioned of which engages one side of the said lever 34. The spring 36 holds the lever 34 in engagement with the fulcrum roller 72 and said fulcrum rollers are moved by means of the fluid pressure at one side of the diaphragm 2. In the present instance a cylinder 82 containing a piston 84 is connected to the diaphragm chamber 1 at one side of the diaphragm 2 so that the piston 84 is actuated in one direction by the pressure of the fluid in the chamber 1 against the action of a spring 86, and in the other direction by said spring 86. The piston 84 is pivotally connected by a link 88 to a lever 76 intermediate its ends. One end of said lever 76 is pivotally mounted on a fixed support as at 80, and the other end of said lever carries a slotted member 74 which receives the shaft of the fulcrum rollers 70, 72, as clearly shown in Figure 1. The end of the lever 76 opposite its pivot is provided with a counter weight 78. Thus, as the pressure in the diaphragm chamber 1 varies, the lever 76 is oscillated and through its slotted member 74 moves the fulcrum rollers 70, 72 longitudinally of the lever 34.

The end of the lever 34 opposite the spring 36 bears through a knife edge connection 32 on one end of a lever 26 which is connected at said end to one end 31 of a pair of flexible or resilient strips 30 rigidly connected at their other ends to fixed supports 28. The opposite end of said lever 26 is provided with laterally projecting arms 25 which are connected by means of flexible or resilient strips 24 to the lever 20, as clearly shown in Figures 1 and 2. The lever 26 is also provided with a variable fulcrum, said fulcrum consisting in the present instance of two rollers 45 mounted on a shaft and movable over a guide 42, and a roller 44 rotatably mounted on the same shaft coaxially with said rollers 45 and engaging the under side of the lever 26. A pair of links 52 have one end pivotally connected and carrying a roller 48, and one end of one of said links is pivotally connected to a rod 46 mounted on the yoke carrying the rollers 44 and 45 and the opposite end of the other of said links 52 is pivotally connected to one end of the piston rod 54 of the piston 56 of the fluid motor. The roller 48 is mounted in a curved guideway 50. With this construction, when the piston 56 is actuated upon departures from balance in the system, the rollers 44 and 45 are moved by means of the piston rod 54 and links 52 so as to vary the force of the spring 36 and balance the force acting on the diaphragm 2.

The pressure exerted by the lever 34 on the lever 26 is a function of the force of the spring 36 and the pressure in the cylinder 82. The links 52, roller 48 and curved guideway 50 so affect actuation of the movable fulcrum rollers 44 and 45 as to produce a special and definite relation between the leverage and the value which is determined by the form of the guideway; the said leverage is a function of said value and the motion of the piston 56 is proportional to the magnitude of the flow of fluid in the conduit 3. The position of the piston rod 54 is a measure for the flow of fluid through the conduit 3, and said piston rod may be provided with a pointer cooperating with a graduated scale, as at 60, to indicate said measurement.

The operation of the system may be graphically described with reference to Figure 4 of the drawings. The line or abscissa G represents the flow of fluid through the conduit 3 and the ordinate $p^1-p^2$ represents the difference in pressure at opposite sides of the diaphragm 2. Thus the simple relation of the pressure difference and the flow of fluid, in other words, the magnitude of the flow of fluid in conduit 3 which follows a quadratic law, is indicated by curve $a$. Now with the effective force on the links 24 and 4 acting on the diaphragm 2, graphically on line $p^1-p^2$, and the position of the fulcrum 44 of the lever 25 being influenced by changes in magnitude of flow, graphically on line G, the magnitude of flow will be indicated by curve $b$ because the lever system does not follow a quadratic law. In accordance with the invention, the difference between these two curves $a$ and $b$ is corrected by eliminating the differences between the quadratic law and the law of the lever system through the links 52, roller 48 and guideway 50, so that the fulcrum roller 44 is moved to restore balance in the system after each variation in the flow of fluid in the conduit 3 by movements of the piston 56 which are proportional to the flow of fluid. In other words, the links 52, roller 48 and guideway 50 cause the movements of the fulcrum roller to be in approximately quadratic relation to the force produced by the variations in the flow of fluid, and the movements of the pointer 60 are thereby proportional to the flow of fluid.

While I have shown the system embodying mechanisms of certain detail constructions it will be understood that this is mainly for illustrating the principles thereof, and that many modifications and changes in the detail mechanism may be made without departing from the spirit or scope of the invention. For instance, should it be desired to measure other values than fluid flow, suitable means sensitive to the desired value could be provided by those skilled in the art instead of the flow resisting device and the diaphragm and casing 2 and 1. Therefore, I do not wish to be understood as restricting myself except as required by the following claims when construed in the light of the prior art.

Having thus described the invention, what I claim is:

1. A device of the character described for measuring a variable value, comprising means operating on a lever principle the leverage of which is variable, means actuated by said value so as to produce a force, means for producing another force, means for connecting the second-mentioned means and the third-mentioned means to the first-mentioned means whereby the latter is actuated to produce a balanced relation between said value and said force, means other than the displacement of the points of connection of said second-mentioned means and said third-mentioned means to said first-mentioned means for varying the leverage of said first-mentioned means to restore balance between said value and said second force after departures from said balanced relation due to variations in said value, and means for indicating the variations in said leverage to measure said value.

2. A device of the character described for measuring a variable value, comprising means operating on a lever principle the leverage of which is variable, means actuated by said value so as to produce a force, means for producing another force, means for connecting the second-mentioned means and the third-mentioned means to the first-mentioned means whereby the latter is actuated to produce a balanced relation between said forces, means connected with the second-mentioned means so as to be responsive to departures from said balanced relation upon variations in said value, a motor, means operated by said motor for varying the leverage of said first-mentioned means, a governor for said motor, an operative connection between said governor and said means responsive to departures from said balanced relation for actuating said governor to restore balanced relation of said forces after each departure therefrom, whereby said leverage is a function of said value, and means for indicating the variations in said leverage to measure said value.

3. A device of the character described for measuring a variable value, comprising means operating on a lever principle, means actuated by said value so as to produce a force, means for producing another force, means for connecting the second-mentioned means and the third-mentioned means to the first-mentioned means whereby the latter is actuated to produce a balanced relation between said forces, said first-mentioned means having a variable fulcrum for varying the leverage, means connected to said second-mentioned means so as to be responsive to departure from said balanced relation upon variations in said value, a motor, means operated by said motor for moving said fulcrum, a governor for controlling said motor, an operative connection between said governor and said means responsive to departures from balance for actuation of said governor to restore balanced relation between said value and the second force after departures from balance, whereby the position of said fulcrum is a function of said value, and means for indicating the variations in the position of said fulcrum to measure said value.

4. A device of the character described for measuring a variable value, comprising means movable by said value so as to produce a force, means operating on a lever principle and actuated by the force produced by said value and by another force to produce a balanced relation between said two forces, means for producing the second-mentioned force, means connected with the first-mentioned means so as to be responsive to departures from said balanced relation upon variations in said value, a motor, means actuated by said motor for varying the leverage of said second-mentioned means, a governor for said motor, an operative connection between said governor and said means responsive to departures from balance for actuation of said governor to restore said balanced relation after departures therefrom, means for varying the actuation of said last-mentioned means by said motor for producing an approximately quadratic relation between the movement of said motor operated means and the force produced by said variable value, and means for indicating the movement of said motor to measure said value.

5. A device of the character described for measuring a variable value, comprising means operating on a lever principle actuated by force produced by said value and by another force to produce a balanced relation between said two forces, means for producing the second-mentioned force, means actuated by the first-mentioned means so as to be responsive to departures from said balanced relation upon variations in said value, a motor, means including a plurality of pivotally connected links actuated by said motor for varying the leverage of said first-mentioned means, a governor for said motor, an operative connection between said governor and said means responsive to departures from balance for actuation of said governor to restore said balanced relation after departures therefrom, a curved guide for varying the pivotal movement of said links during operation of said leverage varying means by said motor for producing a special and definite relation between said leverage and said value, and means for indicating variations in said leverage to measure said value.

6. A device of the character described for measuring a variable value, comprising means sensitive to variations in said value and producing a force, means for producing an auxiliary force, a lever system to cooperate with said first two-mentioned means to produce a balanced relation therebetween, said lever system having a movable fulcrum, means connected with said sensitive means so as to be responsive to departures from said balanced relation upon variations in said value, a motor for moving said fulcrum to vary the leverage of said system, a governor for said motor, an operative connection between said governor and said means responsive to departures from said balanced relation for actuation of said governor to restore said balanced relation after departures therefrom, means arranged between said movable fulcrum and said motor and actuated by said motor for producing a special and definite relation between said leverage and said value, and means for indicating variations in said leverage to measure said value.

7. A device of the character described for measuring a variable value, comprising means sensitive to variations in said value and producing a force, means for producing an auxiliary force, a lever system to cooperate with said first two-mentioned means to produce a balanced relation therebetween, said lever system having a movable fulcrum, means connected with said sensitive means so as to be responsive to departures from said balanced relation upon variations in said value, a motor for moving said fulcrum to vary the leverage of said system, a governor for said motor, an operative connection between said governor and said means responsive to departures from said balanced relation for actuation of said governor to restore said balanced relation after departures therefrom, means connecting said movable fulcrum and said motor and movable in the same direction with and in another direction relatively to both thereof, a curved guide cooperating with said last-mentioned means for moving the same in the second-mentioned direction, whereby an approximately quadratic relation between said value and the movement of said fulcrum is produced, and means for indicating the movement of said motor.

8. A device of the character described for measuring a variable value, comprising means sensitive to variations in said value and producing a force, means for producing an auxiliary force, a lever system to cooperate with said first two-mentioned means to produce a balanced relation therebetween, said lever system having a movable fulcrum, a flexible support for said lever system, a fixed flexible connection between said sensitive means and said lever system, a fixed connection between said lever system and said second-mentioned means, means connected with aid sensitive means so as to be responsive to departures from said balanced relation upon variations in said value, a motor for moving said fulcrum, a governor for said motor, an operative connection between said governor and said means responsive to departures from said balanced relation for actuation of said governor to restore said balanced relation after departures therefrom, and means for indicating the movement of said motor.

ERICH ROUČKA.